United States Patent Office 3,134,753
Patented May 26, 1964

3,134,753
OXIDATION OF ARYLOXY-SUBSTITUTED PHENOLS
Jack Kwiatek, Schenectady, N.Y., assignor to General Electric Company, a corporation of New York
No Drawing. Filed June 24, 1958, Ser. No. 744,087
19 Claims. (Cl. 260—47)

This invention relates to the oxidation of aromatic compounds containing an hydroxy group directly bonded to the aromatic nucleus by a process which comprises reacting the compounds with oxygen in the presence of a catalyst comprising a tertiary amine and a cuprous salt and to the novel products produced by this method. More particularly, this invention relates to the oxidation of aryloxy-substituted phenols in the presence of a catalyst comprising a tertiary amine and a cuprous salt and to the polymeric products produced thereby. Specifically, this invention relates to the oxidation of aryloxy-substituted monohydric phenols in the presence of a catalyst comprising a tertiary amine selected from the group consisting of aliphatic tertiary amines and cyclic tertiary amines and a cuprous salt soluble in the tertiary amine, said cuprous salt being capable of existing in the cupric state, and to the polyphenylene ethers produced by this process.

The term "aryloxy-substituted monohydric phenol" is used to include those compounds containing only one hydroxyl group directly attached to a six-membered aromatic ring composed only of carbon atoms, viz., a monohydric phenol of the benzene series, said phenol containing an aryloxy substituent in either the ortho or para position of the benzene ring. Such a term includes by way of example: 2-phenoxy phenol; 4-phenoxy phenol; 2 - (2' - methylphenoxy) phenol; 2' - (4'-methylphenoxy) phenol; 2-methyl, 4-(2',4'-dimethylphenoxy) phenol, etc., as well as those compounds wherein the phenoxy substituent is itself also substituted by another phenoxy group, for example, a compound such as 2,6-dimethyl, 4-[2',6'-dimethyl, 4'-(2"6"-dimethylphenoxy)phenoxy] phenol.

In copending applications, Serial No. 69,245, filed November 15, 1960, and Serial No. 212,128, filed July 24, 1962, which are continuations-in-part of an abandoned application Serial No. 744,086 filed concurrently herewith, all in the name of Allan S. Hay, and assigned to the same assignee as the present application, there is disclosed a method for oxidizing monohydric monocyclic phenols in the presence of a catalyst comprising a tertiary amine selected from the group consisting of aliphatic tertiary amines and cyclic tertiary amines and a cuprous salt soluble in the tertiary amine, said cuprous salt being capable of existing in the cupric state and to the polyphenylene ethers produced by this process. In this application, it is disclosed that to form such polyarylene ethers it was necessary to use a phenol as a starting material which contained at least 1 ortho or para position which contained either a hydrogen, chlorine, bromine, or iodine substituent. Polyarylene ethers were not obtained when the materials contained substituents other than hydrogen, chlorine, bromine or iodine in both ortho positions and the para position. Hay also disclosed that substituents of his phenol could be an alkoxy or aryloxy group. However, such a substituent did not participate in the formation of the polyarylene ether.

Unexpectedly, I have found that if a phenol of the benzene series has all three ortho and para positions substituted with at least one of the substituents being an aryloxy radical which has at least one substituent in the ortho position and one unsubstituted position in the ortho or para position that the resulting aryloxyphenol can be oxidized by the same method as the Hay phenols to produce polyarylene ethers. If the reaction is to produce useful resins there must be only one such aryloxy substituent on the phenolic nucleus. Although there may be other aryloxy substituents that have no unsubstituted ortho and para positions, an extension of this study showed that, if the aryloxy substituent is further substituted so that it contains an aryloxy substituent which has at least one ortho substituent and one unsubstituted ortho or para position, the resulting aryloxyaryloxy phenol can also be oxidized in the same manner to produce polyphenylene ethers.

If the substituents on the various aryl nuclei are different it is possible to produce a mixed polyarylene ether that is in the nature of an ordered copolymer since the different aryl nuclei will appear in an ordered arrangement along the polyarylene ether molecule. Such materials are not attainable with the process disclosed in the above-identified Hay application.

The overall oxidation reaction to which my invention is directed is the reaction involving the hydrogen atom of the penolic group of one aryloxy phenol molecule, a hydrogen in the ortho (2-) or para (4-) position in the terminal aryloxy group of another aryloxy phenol molecule and oxygen with the formation of water according to the following schematic diagram, using the para position for purposes of illustration.

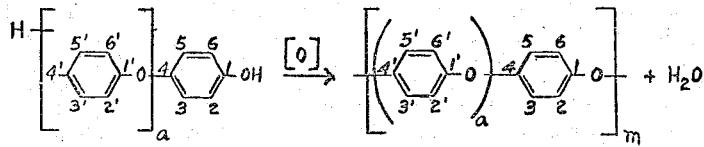

where $a$ is a whole number equal to from 1 to 2, inclusive, and $m$ is at least 2 and the numbers indicate the positions of substituents and joining in the names used in the specification.

It is to be understood that the reaction is not a direct oxidation as illustrated, but an oxidation involving participation of the copper catalyst system.

The general method of carrying out my oxidation process is to mix one or more of the phenoxy-substituted monohydric phenols (hereinafter sometimes referred to as "aryloxy phenols") as starting material, tertiary amine and cuprous salt.

The phenol starting materials may be represented by the following structural formula:

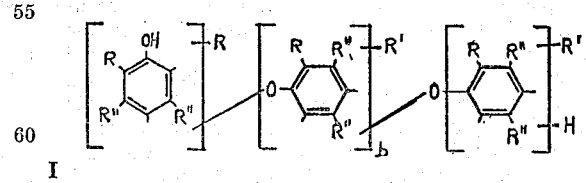

I where $b$ is an integer and is at least 0 and not more than 1, R is a monovalent substituent selected from the group consisting of hydrocarbon radicals, halohydrocarbon radicals having at least 2 carbon atoms, alkoxy radicals and haloalkoxy radicals having at least 2 carbon atoms, R' and R" are the same as R and in addition hydrogen. If the proviso is made that R, R' and R" are so chosen that any 2 adjacent benzene rings contain a different configuration as regards the R, R' and R" substituents, i.e., any two adjacent aryl nuclei are structurally different, the resulting polyarylene ethers will be completely different from the polyarylene ethers claimed in the aforementioned Hay application.

In preparing the catalyst system comprising a cuprous salt and tertiary amine, the particular cuprous salt used has no effect on the type of product obtained. The only requirement for the cuprous salt is that it must form a complex with the tertiary amine that is soluble in the reaction medium, and must be capable of existing in the cupric state. The necessity for being able to exist in the cupric state is based on the belief that the oxidation of the phenol is accomplished by an intermediate formation of an activated cupric amine complex that reacts with the phenol to regenerate the cuprous amine complex. As far as it can be determined, it is impossible to form this activated complex by starting originally with a cupric salt and making the copper amine complex, unless reducing conditions are present to form the cuprous salt in situ. Typical examples of the cuprous salt suitable for my process are cuprous chloride, cuprous bromide, cuprous sulfate, cuprous azide, cuprous tetramine sulfate, cuprous acetate, cuprous propionate, cuprous palmitate, cuprous benzoate, etc. Cuprous chloride, cuprous bromide, and cuprous azide produce the highest molecular weight polymers. Although cupric sulfite is not known, cuprous sulfite can be used because it evidently is oxidized to cuprous sulfate. Cuprous salts such as cuprous iodide, cuprous sulfide, cuprous cyanide, cuprous thiocyanide, etc. are not suitable for use in my process since they are either not soluble in the tertiary amines or are not capable of existing as stable cupric salts. For example, cupric cyanide and cupric thiocyanate autogenously decompose to the corresponding cuprous salt. Cuprous nitrate and cuprous fluoride are not known to exist but the amine complexes can be made in situ. Substitution of cupric chloride, cupric sulfate, cupric perchloride, and cupric nitrate for the cuprous salt will give negative results in the oxidation reaction.

Since the reaction does not destroy the catalyst, only a small catalytic amount of cuprous salt needs to be used, of the order of 0.1 to 10 mol percent, based on the mols of aryloxy phenol to be oxidized although larger amounts can be used, if desired.

Examples of tertiary amines which may be used in practicing my invention are the aliphatic tertiary amines such as trimethyl amine, triethyl amine, tripropyl amine, tributyl amine, trisecondary propylamine, diethylmethyl amine, dimethylpropyl amine, allyldiethyl amine, dimethyl-n-butyl amine, diethylisopropyl amine, benzyldimethyl amine, dioctylbenzyl amine, dioctylchlorobenzyl amine, dimethylcyclohexyl amine, dimethylphenethyl amine, benzylmethylethyl amine, di(chlorophenethyl), bromobenzyl amine, 1-dimethylamino-2-phenylpropane, 1-dimethylamino-4-pentene, etc. When aliphatic tertiary amines are used, it is preferred that at least two of the aliphatic groups be straight chain hydrocarbon groups.

Examples of cyclic amines are the pyridines, such as pyridine itself, the n-alkyl piperidines, the quinolines, the isoquinolines, the n-alkyl tetrahydroquinolines, the n-alkyl tetrahydroisoquinolines, the n-alkyl morpholines, etc., including the ring-substituted products of these cyclic amines, whereby one or more of the hydrogen atoms on the carbons forming the ring are substituted by groups which may be alkyl (for example, methyl, ethyl, propyl, butyl, amyl, hexyl, heptyl, octyl, etc. and isomers and homologs thereof), alkoxy (for example, methoxy, ethoxy, propoxy, butoxy, etc., and isomers and homologs thereof), aryl (for example, phenyl, tolyl, dimethylphenyl, chlorophenyl, bromotolyl, naphthyl, chlorobromonaphthyl, etc., and isomers and homologs thereof), aryloxy (for example, phenoxy, toloxy, xyloxy, chlorophenoxy, naphthoxy, etc., and isomers and homologs thereof), and the like. The ring substituents may be the same or different hydrocarbon groups. It is understood that when piperidines, tetrahydroquinolines, and tetrahydroisoquinolines are used, they are tertiary amines whereby an alkyl hydrocarbon radical such as those listed above for the ring substituents is also attached to the amine nitrogen group.

The effect of an N-aryl group in tertiary amines, for example, N,N-dimethyl aniline, methyldiphenyl amine, etc., is to reduce the basicity of the amine so that its ability to form the copper complex is greatly reduced. Furthermore, the stability of the amine under oxidizing conditions is greatly reduced. Because of these two effects, tertiary amines which do not have an N-aryl substituent are preferred.

Typical examples of the monovalent hydrocarbon radicals that R, R' and R'' may be, in Formula I, are alkyl, including cycloalkyl, for example methyl ethyl, propyl, isopropyl, butyl, secondary butyl, tertiary butyl, isobutyl, cyclobutyl, amyl, cyclopentyl, hexyl, cyclohexyl, methylcyclohexyl, ethylcyclohexyl, octyl, decyl, octyldecyl, and so forth; alkenyl, including cycloalkenyl, for example, vinyl, allyl, butenyl, cyclobutenyl, isopentenyl, cyclopentenyl, linolyl, etc.; alkynyl, for example propargyl, etc., aryl, including alkaryl, for example, phenyl, tolyl, ethylphenyl, xylyl, naphthyl, methylnaphthyl, etc., aralkyl, for example, benzyl, phenylethyl, phenylpropyl, tolylethyl, etc. The monovalent halohydrocarbon radicals may be the same as the hydrocarbon radicals, as outlined above, except methyl, wherein one or more of the hydrogen atoms are replaced by halogens, examples of which are chloroethyl, bromoethyl, fluoroethyl, dichloroethyl, bromoethyl, fluoroethyl, dichloroethyl, bromopropyl, dichlorodifluoroethyl, difluoroiodoethyl, bromobutyl, fluoroamyl, chlorovinyl, bromoallyl, fluoropropargyl, mono-, di-, tri-, tetra- and pentachlorophenyl, mono-, di-, tri- and tetrabromotolyl, chloroethylphenyl, ethylchlorophenyl, fluoroxylyl, chloronaphthyl, bromobenzyl, iodophenylethyl, phenylchloroethyl, bromotolylethyl, etc.

Typical examples of the monovalent alkoxy radicals are methoxy, ethoxy, propoxy, isopropoxy, butoxy, secondary butoxy, tertiary butoxy, amoxy, hexoxyl, octoxy, decoxy, vinoxy, alloxy, butenoxy, propargoxy, benzoxy, phenylethoxy, phenylpropoxy, tolylethoxy, etc. The monovalent haloalkoxy radicals may be the same as the above oxyhydrocarbons except methoxy, where one or more of the hydrogens are replaced by a halogen, for example, fluorine, chlorine, bromine, or iodine, a few typical examples of which are chloroethoxy, bromoethoxy, fluoroethoxy, dichloroethoxy, bromopropoxy, difluorochloroethoxy, iodobutoxy, fluoroamoxy, chlorovinoxy, bromoalloxy, fluoropropargoxy, bromobenzoxy, chlorophenylethoxy, phenylchloroethoxy, bromotolylethoxy, etc. Preferably R' and R'' are each hydrogen, R is a hydrocarbon radical of from 1 to 10 carbon atoms and the phenoxy substituent is in the para position.

Halomethyl groups are so chemically reactive that they produce undesirable by-products in my oxidation reaction. Therefore, I prefer to exclude aryloxy phenols containing such substituents from my reaction mixture as a principal reactant, although they may be present in small quantities as modifiers. Other ring substituents such as cyano, carboxyl, formyl, etc., which are reactive with amines or copper salts, should also be excluded as substituents of the aryloxy phenols used as the principal reactants.

Typical examples of phenols falling within the scope of the above formula and which have only one aryloxy substituent, are:

2,6-dimethyl-4-(2',6'-dimethylphenoxy)phenol,
2,6-diethyl-4-(2',4'-dimethylphenoxy)phenol,
2,6-dipropyl-4-(2',6'-diethylphenoxy)phenol,
2,6-dibutyl-4-(2'-methyl-6'-ethylphenoxy)phenol,
2,6-dioctyl-4-(2',6'-diphenylphenoxy)phenol,
2-methyl-6-ethyl-4-(2',6'-dichloroethylphenoxy)phenol,
2-ethyl-6-butyl-4-(2'-benzyl-6'-methylphenoxy)phenol, 2-methyl-4-ethyl-6-(2',4'-dimethylphenoxy)phenol,
2,4-dimethyl-6-(2',4'-dimethylphenoxy)phenol,
2,3,6-trimethyl-4-(2',3'-dimethylphenoxy)phenol,
2,4-dimethyl-6-(2'-methylphenoxy)phenol,
2,3,5,6 - tetramethyl-4-(2',3',5',6' - tetramethylphenoxy)phenol,
2,6-dimethyl-4-(2'-ethylphenoxy)phenol,
2-methyl-4-ethyl-6-(2'-ethylphenoxy)phenol,
2,4-dimethyl-6-(2'-butylphenoxy)phenol,
2,6-dioctyl-4-(2'-methylphenoxy)phenol,
2,6-dimethyl-4-(2'-cyclohexylphenoxy)phenol,
2,6-dimethyl-4-(2'-phenylphenoxy)phenol,
2,6-dimethyl-4-(2'-tolylphenoxy)phenol,
2,6-dimethyl-4-(2'-chloroethylphenoxy)phenol,
2,6-dimethyl-4-(2'-bromobutylphenoxy)phenol,
2,4-dimethyl-6-(2'-fluorophenylphenoxy)phenol,
2,4-dimethyl-6-(2'-chlorocyclopentylphenoxy)phenol,
2,6-dimethyl-4-(2',6'-dimethoxyphenoxy)phenol,
2,6-dimethoxy-4-(2'-methylphenoxy)phenol,
2,6-dimethyl-4-(2',6'-diethoxyphenoxy)phenol,
2,6-dimethyl-4-(2',6'-dichloroethoxyphenoxy)phenol, etc.

Typical phenols having two aryloxy substituents are:

2,6-dimethyl-4-[2',6'-dimethyl-4'-(2'',6''-dimethylphenoxy)phenoxy]phenol,
2,6-dimethyl-4-[2'-methyl-4'-(2''methylphenoxy)phenoxy]phenol,
2 - methyl-6-ethyl-4-[2'-propyl-4'-(2''-butylphenoxy)phenoxy]phenol,
2 - methyl - 6 - phenyl-4-[2' - ethyl-6'-fluorophenyl-4'-(2''-propyl-6''-butylphenoxy)phenoxy]phenol,
2,4 - dimethyl-6-[2',6' - dimethyl-4'-(2'',4''-dimethylphenoxy)phenoxy]phenol,
2,6 - dimethyl-4-[2'-phenyl-4'-(2'' - cyclohexylphenoxy)phenoxy]phenol,
2 - methyl-4-methoxy-6-[2',6'-dibromobutyl-4'-(2'',6''-dichlorobutoxyphenoxy)phenoxy]phenol,
2 - methyl-6-tolyl-4-[2' - phenylethyl-4'-(2'' - iodophenylphenoxy)phenoxy]phenol,
2,3,5,6 - tetramethyl-4-[2',3',5',6'-tetramethyl-4'-(2'',3'',5'',6'',-tetramethylphenoxy)phenoxy]phenol, etc.

These compounds are conveniently prepared by the Ullmann reaction. The desired phenol is brominated and converted to the methyl ether, which is reacted with the potassium salt of the phenol which it is desired to have as the aryloxy substituent on the phenol. The methyl ether is converted to the corresponding phenol by removal of the methyl group with hydrogen iodide. By converting this product to the potassium salt and reacting it with the previously described bromophenylmethyl ether, one can prepare aryloxyphenols containing an aryloxy substituent on the aryloxy group. These reactions can be expressed by the following equations.

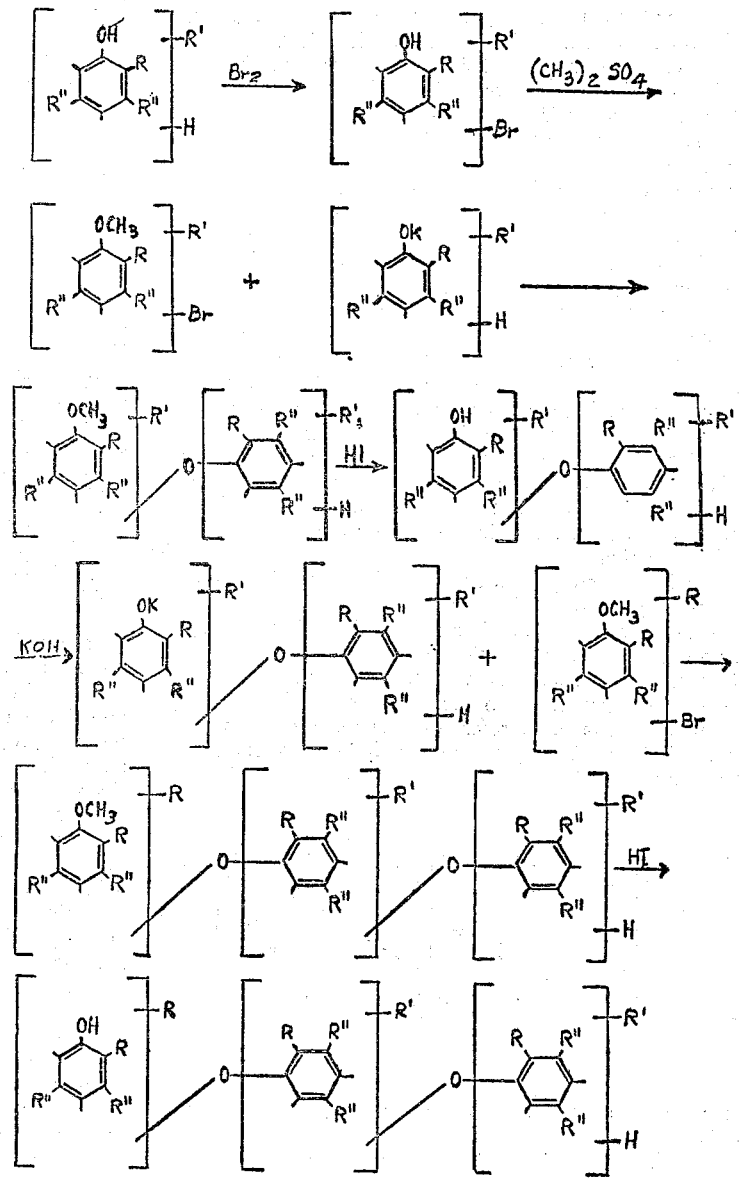

When the aryloxyphenol has two aryl nuclei, i.e., a phenoxyphenol, or has three aryl nuclei, i.e., a phenoxyphenoxyphenol, and all three nuclei have the same configuration, i.e., same substituents in the same relative placement, the product of the oxidation reaction would be identical with the products obtained by oxidizing a phenol of the type taught and claimed in the aforementioned Hay application. In this instance, the phenoxyphenols may be considered dimers and the phenoxyphenoxyphenols may be considered trimers, of the phenols used as starting materials by Hay. However, when at least one phenoxy radical and the phenol nucleus have different configurations, i.e., the aryl nuclei are structurally different then the polymer obtained by the oxidation reaction will contain repeating units wherein each unit contains two different phenoxy nuclei, three different phenoxy nuclei, or two identical phenoxy nuclei, and one dissimilar phenoxy nucleus. In other words, if one allows different letters to represent different phenoxy nuclei, one would have polymer chains whose pattern of repeating phenoxy nuclei are ABABAB; ABCABCABC; ABBABBABB; AABAABAAB. When starting with two different phenoxyphenols, if the configuration of the phenolic nucleus of one is identical with the configuration of the phenoxy nucleus of the second and the configuration of the phenoxy nucleus of the first is identical with the configuration of the phenolic nucleus of the second, then the polymers obtained from the two different starting materials should be identical.

I have determined that it is necessary to have the oxidation reaction involve only the para position and the phenolic hydrogen if the highest molecular weight polyarylene ethers are to be obtained. However, satisfactory polyarylene ethers can be made by oxidizing phenols utilizing the ortho position, as will be illustrated in the examples. If the oxidation is carried out with aryloxy phenols which can react through either the ortho or para position of the aryloxy group, it appears that the para position will preferentially react with the phenolic group.

I have found that very high molecular weight polyarylene ethers can be made with extremely high softening points in the range of 250° to 300° C. or greater, as shown by the pressing temperature required to shape them. Depending upon the conditions under which they are made, they either remain thermoplastic under continued heating and vacuum, at 250° C., or cure to an infusible state where they are no longer soluble in the usual organic solvents, such as toluene, xylene, chloroform, nitrobenzene, etc., in which they are soluble prior to heat treating.

As will be readily apparent from the above discussion, the aryloxyphenols which can be oxidized by my reaction can have substituents in all available positions except for one ortho or para position in the aryloxy substituent. However, since substituents in the meta positions add no desirable properties to the polymers, and are more expensive to make, I prefer that the meta positions be unsubstituted. These compounds may be represented by the formula:

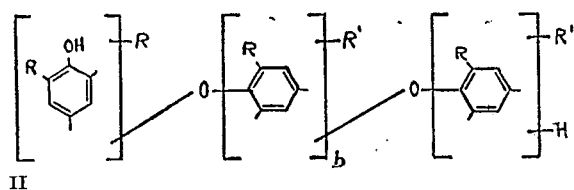

II where $b$, R, and R' are as previously defined for Formula I.

However, to obtain the highest molecular weight compounds which also have the most desirable properties, the formula of these compounds should be:

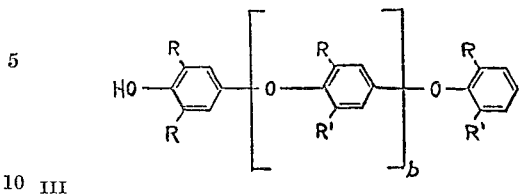

III where $b$, R, and R' are as previously defined for Formula I.

The compounds corresponding to Formulae I, II and III will produce polyarylene ethers, when oxidized by my process, which are represented by the formula:

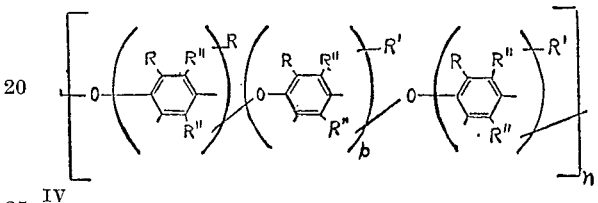

IV where the free valence of the terminal oxygen atom of one unit is connected to the free valence of the terminal benzene nucleus of the adjoining unit, $b$, R, R' and R'' are as defined for Formula I and $n$ is an integer of indeterminate value in excess of 1 since the resinous products are mixtures of different chain lengths and the ordinary means of determining molecular weights gives an average value. For those materials of low molecular weight $n$ is an average of 10 to 15, while for the high molecular weight resins having film and fiber forming properties, $n$ may be from 100 to 1500 or greater.

My oxidation process is capable of producing polyarylene ethers having molecular weights of at least 10,000 by viscosity measurements. Such resins represent polymers having at least 50 repeating units when $b$ is 0, and at least 30 when $b$ is 1. Those high molecular weight materials which are made from aryloxyphenols which have at least two adjacent aryl nuclei with a different configuration, i.e., R, R' and R'' are different in at least number, name or arrangement on the ring, are new chemical compositions.

In general, amines, including tertiary amines, do not tend to be chemically stable in an oxygen atmosphere. It is well known that amines tend to discolor even if left in the presence of a limited amount of air. This tendency to discolor with the accompanying formation of complex products does not seem to be as prominent a characteristic of pyridine and its ring-substituted derivatives, but is characteristic of such closely related compounds as the quinolines. When tertiary amines which tend to discolor in the absence of a nitroaromatic compound are used, the products are not as pure and the physical properties are not as desirable as when a tertiary amine is used that is stable in the presence of oxygen. Therefore, under such conditions, I prefer to use a pyridine as the tertiary amine in the catalyst mixture. By the term "a pyridine" I mean those aromatic organic compounds having a six-membered aromatic ring, five of the members being carbon and one being nitrogen. Typical examples of pyridines are: pyridine itself, β-collidine, β- and γ- picoline, 3,4-lutidine, α- and γ-collidine, α-picoline, and the 2,4- 2,5- and 2,6-lutidines.

Although I do not want to be bound by theory, I believe that 1 mole of cuprous salt forms a complex with two moles of an amine. This complex can react with oxygen to form an oxidized intermediate which in some manner can form a complex with the aryloxy phenol. This latter complex activates the terminal aryl nuclei in some way so that the aryloxyphenol units unite to form polymeric chains. This belief is based on the fact that if oxygen is passed into the catalyst system until it is saturated and then the aryloxyphenol added with no further addition of oxygen, one mole of aryloxyphenol is oxidized for each mole of catalyst present. These reactions are illustrated by the following equations using $\phi$ to represent the aryl nucleus of the aryloxyphenol reactant and (A) to represent the tertiary amine and CuCl as representative of a typical cuprous salt.

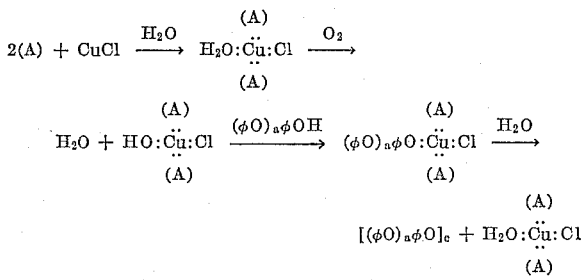

where $a$ is 1 or 2, and $c$ is 2 or more.

Although mixtures of tertiary amines and mixtures of cuprous salts may be used, no benefit would accrue from such use. Preferably, the cuprous salts is dissolved in the tertiary amine before the phenol reactant is added. In some cases, the dissolving of the cuprous salt may be hastened by heating the mixture, by bubbling in air or oxygen, or a combination thereof. In order to effectively use all the copper, enough amine should be added to complex and thereby dissolve all of the added cuprous salt. Larger excesses of amine do not adversely affect the reaction, and, in some cases, may be desirable in order to completely dissolve all the phenol reactants and to act as a solvent for the reaction product. Other solvents such as alcohols, ketones, hydrocarbons, chlorohydrocarbons, nitrohydrocarbons, ethers, esters, amides, mixed ether-esters, sulfoxides, etc. may be present in the reaction system providing they do not interfere or enter into the oxidation reaction. Oxygen or an oxygen-containing gas is bubbled into the reaction mixture causing an exothermic reaction to take place with the formation of water as a by-product. Unlike the reaction described in the Hay application, it is impossible to obtain diphenoquinones as the product. Therefore, it is unnecessary to control the escape of water from the reaction mixture. However, it has been found that the reaction proceeds more rapidly if there is always present one mol of water for each mol of copper catalyst. Such conditions can be assured by carrying out the reaction under reflux conditions, in a closed reaction system, at superatmospheric pressure, by cooling, in the presence of desiccants, or any combination thereof.

Since the reaction is usually exothermic, the reaction can become overheated, resulting in the formation of undesirable products. If the heat of reaction is not controlled, the resins tend to cross-link and form gels. Generally, I initiate the oxidation reaction at as low a temperature as the reaction will start, as evidenced by the reaction becoming exothermic. Usually, I control my oxidation reactions so that the maximum temperature does not exceed 100° C., and preferably does not exceed 80° C. The heat of reaction may be removed, for example, by radiation, convection, or by cooling coils which can either be immersed in or surround the reaction vessel.

Ordinarily, I continue the passage of oxygen into the reaction mixture until no more heat is generated or the desired amount of oxygen is absorbed. Alternatively, I may intermittently or continuously add the same or a different aryloxy phenol than the starting material or a phenol during the oxidation reaction to produce a mixed polyarylene ether copolymer which has a different structure than if all of the reactants were used as starting materials. To terminate the reaction, I destroy the catalyst system by addition of an acid preferably a mineral acid such as hydrochloric or sulfuric acid which reacts with the tertiary amine and cuprous salt or I remove the product from the presence of the catalyst either by filtering off the product if it has precipitated, or by pouring the reaction mixture into a material which is a solvent for the catalyst system but a non-solvent for the product. Alternatively, I may precipitate the copper as an insoluble compound and filter it from the solution prior to isolating the product, or I may add a chelating agent which inactivates the copper. After the product is precipitated, it may be redissolved and reprecipitated any desirable number of times to remove impurities. Finally, it is filtered and washed free of any remaining contaminants. When dry, the product can be fabricated into useful products by molding, extrusion, melt-spinning, etc., or it may be dissolved in solvents to prepare solutions which can be used in the preparation of coatings, fibers, adhesives, etc.

Modifiers of the reaction can be added to the reaction mixture to yield products which have improved properties over the products prepared in the absence of the modifier. Modifiers which have been found to be particularly useful are: anion exchange resins, especially those containing tertiary amine groups as the active moiety, nitroaromatics such as mono-, di-, and trinitrobenzenes, mono-, di-, and trinitrotoluenes, mono-, di-, and trinitrophenols, etc., peroxide deactivators such as heavy metals, and their oxides, absorbents such as activated charcoal, silica gel, alumina, etc.

Although the anion exchange resins are insoluble in the reaction mixture, it appears that they function in some way, probably as promoters or cocatalysts, with the copper amine complex. As far as I am aware, there is no requirement that these resins must meet other than that they must be able to absorb anions, which is a characteristic of all anion exchange resins. Typical examples of such anion exchange resins which can be used are amine modified or quaternized polymers, for example, cross-linked styrene, dimethyl benzene polymers, styrene glycol dimethylacrylate polymers, aniline formaldehyde resins, aryl polyamine formaldehyde resins, phenol formaldehyde resins, urea formaldehyde resins, melamine formaldehyde resins, and so forth, which have been modified with amines. Those compounds which are reaction products of formaldehyde can be modified with amines while in the methylol stage. All compounds can be chloromethylated and then reacted with amines. Such materials are readily available commercial products. Since primary and secondary amine groups are reactive with oxygen, I prefer that the amine group be a tertiary amine group, or that the amine be quaternized so that the effectiveness of the resin is not impaired during the oxidation reaction.

The effect of adding nitroaromatics such as picric acid and nitrobenzene to the reaction mixture appears to be the destruction, or the prevention of the formation, of by-products which would react with the main product to produce an impure material of less desirable properties. The use of nitroaromatics is extremely advantageous for producing resinous materials of much lighter color than is possible under the same reaction conditions when they are absent. Their use is particularly desirable when using tertiary amines as the catalyst which are oxidatively unstable, i.e., easily discolor in the presence of oxygen, e.g., aliphatic tertiary amines. Since the nitrophenols can form complexes with the copper amine catalyst, enough catalyst should be used to supply an excess of catalyst over that which will react with any nitrophenol present.

In order to prevent the accumulation of peroxides which may cause attack of the aryloxy phenol at an undesired position on the aromatic rings: peroxide deactivators can be employed, for example, silenium, silicon, lead, mercury, copper, silver, gold, nickel, palladium, platinum, cobalt, rhodium, iridium, iron ruthenium, osmium, manganese, chromium, molybdenum, tungsten, vanadium, niobium, cerium, thorium, etc., and their oxides or salts. Other peroxide deactivators are described on pages 467–501 of "Hydrogen Peroxide" by Shumb, Satterfield and Wentworth, Rheinhold Publishing Corp., New York, N.Y., 1955.

The reaction can also be carried out in the presence of adsorbents which tend to remove byproducts present in minor amounts and which may adversely affect the reaction. Examples of these absorbents are activated carbons, silica gel (including xerogels, aerogels, fume silica, etc.), alumina, magnesium silicate, etc.

It has been found that the quality of the polyarylene ethers may be improved if an organic sulfur containing compound which also has reducing properties is added to the solution of the product at the end of the oxidation reaction. Typical of such compounds are thiourea and its derivatives. These materials not only remove all the copper from the product, but they also destroy color-forming byproducts which may be undesirable in the final product. However, where a colored final product is desired, I may intentionally add hydroquinones or quinones to the reaction mixture to obtain a controlled desired color in my final product. Typical of the hydroquinones that may be used are hydroquinone, catechol, substituted hydroquinones such as toluhydroquinone (methyl hydroquinone), halogen substituted hydroquinones such as tetrachlorohydroquinone, the naphthohydroquinones, the dihydroxyanthracenes, the dihydroxyphenanthracenes, etc.

In order that those skilled in the art may better understand my invention, the following examples are given which are illustrative of the practice of my invention, but are not intended for purposes of limitation. In the examples, all parts are by weight unless stated otherwise. In general the oxidations in the following examples were carried out as follows. Oxygen is passed for a few minutes into a mixture of 0.4 gram of cuprous chloride and 30 millimeters of pyridine to aid in the dissolving of the cuprous salt.

In general, the oxidations are initiated at room temperature (about 27° C.) by passing oxygen or an oxygen-containing gas at a rate fast enough to provide an excess over that being adsorbed into a vigorously-stirred solution containing the above reactants and the aryloxyphenol. Because of the fact that the phenoxyphenol is a solid, it is dissolved in 10 ml. of the tertiary amine. An inert solvent, such as an alcohol or nitrobenzene, would be just as effective. At the end of the reaction period, 360 ml. of an aqueous 2 N solution of hydrochloric acid is added to precipitate the polyarylene ether as an easily filterable solid. The polyarylene ether is dissolved in chloroform and precipitated by adding drop-wise to methanol containing 1% by volume of 12 N hydrochloric acid. This purification step is repeated to obtain a polyarylene ether substantially free of the reaction medium, and of undesirable by-products. Deviations from the above procedure are mentioned in the examples.

Examples 1 and 2 illustrate the method used in preparing the aryloxyphenols used as starting materials in my process. In the examples all temperatures are centigrade.

*Example 1*

2,6-dimethyl-4-bromoanisole was prepared from 2,6-dimethylphenol by the method disclosed by Bruice, Kharasch and Winzler, J. Org. Chem., 18, 83–91 (1953). 170 grams of this compound was reacted with 155 grams of 2,6-dimethylphenol in the presence of 50 grams of potassium hydroxide and 0.5 gram copper powder for four hours at a temperature of 200–220°. After cooling, the reaction mixture was dissolved in benzene and washed with aqueous potassium hydroxide solution until free of unreacted phenol. After washing with water the benzene was removed and the product purified by distillation under reduced pressure. The yield of 2,6-dimethyl-4-(2′,6′-dimethyl phenoxy) anisole was 119 grams.

The methyl group was removed from the methoxyl group to generate the phenol by refluxing 12.8 g. of the above ether in a nitrogen atmosphere for 16 hours in the presence of 63 ml. of 57% aqueous hydrogen iodide and 63 ml. of glacial acetic acid. After cooling, the reaction mixture was added to 375 ml. of water and the solid removed by filtration and dried. Yield, 120 g. crude product, M.P. 100.5–109°, which was recrystallized from 30–60° B.P. petroleum ether to give 10.2 g. of pure 2,6-dimethyl-4-(2′,6′-dimethylphenoxy)phenol, M.P. 110.5–111°. M.W. 245±10% (theory 242) by the ebullioscopic method (benzene).

*Example 2*

24.3 grams of 2,6-dimethyl-4-(2′,6′-dimethylphenoxy) phenol prepared as in Example 1 was reacted with 24 grams of 2,6-dimethyl-4-bromoanisole in the presence of potassium hydroxide and copper powder in the manner described in Example 1. Seven grams of crude ether product was obtained. It was purified by repeated recrystallization from methanol after decolorizing the methanol solution with activated carbon. The yield of purified ether was 3 grams, M.P. 101.5–102°. The methyl group was removed from the methoxy group to generate the phenol and the product purified by the same method as disclosed in Example 1. M.P. 111–112°. A mixed melting point of this product with the product of Example 1 was 82–109°, showing that the two products were different. The molecular weight was 365±5% (theory 362).

*Example 3*

Four grams of 2,6-dimethyl-4-(2′-methylphenoxy) phenol were oxidized using cuprous chloride as the copper salt and pyridine as the amine, as described in the general method. The initial temperature was 30.5° and rose to a maximum of 52° during a reaction period of 3 minutes. The isolated solid product had an intrinsic viscosity of 0.09. It was poly-[2,6-dimethyl-4-(2′-methylphenoxylene)phenylene-1,4′]ether having the repeating structural unit

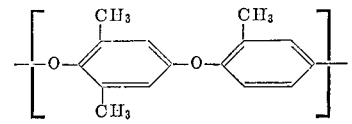

The intrinsic viscosity in all examples was obtained by dissolving the polymer in a good solvent for the polymer. A good solvent is defined as a solvent which will produce solutions of various concentrations such that when the viscosity is plotted against concentration, a straight line is obtained. For the polymers in Examples 3 to 10, toluene or chloroform is satisfactory. Extrapolation of this line to zero concentration gives the intrinsic viscosity. A more complete discussion of intrinsic viscosity is found in R. E. Buck and Oliver Grummett, "High Molecular Weight Organic Compounds," Interscience Publishers, Inc., New York 1949, pages 75–110.

*Example 4*

Example 3 was repeated except 0.2 gram of picric acid was added as a modifier of the reaction and the quantity of the phenol was reduced from 4 to 2 grams. The initial temperature of 31° rose to 41° during the 6-minute reaction period. The solid reaction product was chemically the same as in Example 1 but had a higher molecular weight as shown by an intrinsic viscosity of 0.1. The product was also lighter in color.

*Example 5*

Four grams of 2,6-dimethyl-4-(2′,6′-dimethylphenoxy) phenol was oxidized using the general method. The initial temperature was 29.5° and rose to 51.5° during a 3-minute reaction period. The solid product was poly- (2,6-dimethylphenylene-1,4)ether having the repeating unit.

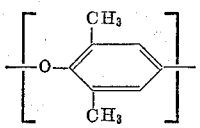

The isolated polymer had an intrinsic viscosity of 1.22.

Example 6

One-tenth of a gram of 2,6-dimethyl-4-[2',6'-dimethyl-4'-(2'',6''-dimethylphenoxy)phenoxy] phenol was oxidized as described in the general method. The initial temperature of 29.5° rose to 30.5° during a reaction time of two minutes. The product was chemically identical to the product of Example 5.

Example 7

Two grams of 2,4-dimethyl-6-(2',6'-dimethylphenoxy) phenol was oxidized by the general method. The initial temperature was 29°. After the initial exothermic reaction (temperature rose to 38°) the reaction mixture was heated to 67° for a total reaction time of 10 minutes. The solid product was poly-[2,4-dimethyl-6-(2',6'-dimethylphenoxylene)phenylene-1,4']ether having the repeating unit

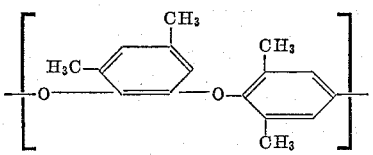

The product had an intrinsic viscosity of .08. When the example was repeated but the temperature maintained at 65–70° during the entire reaction time of 40 minutes, the product was obtained in substantially the same yield and had the same intrinsic viscosity.

Example 8

Example 7 was repeated but using 2,6-dimethyl-4(2',4'-dimethylphenoxy)phenol as the starting material. The product would nominally be named poly-[2,6-dimethyl-4-(2',4'-dimethylphenoxylene)phenylene-1,6']ether and have the repeating unit

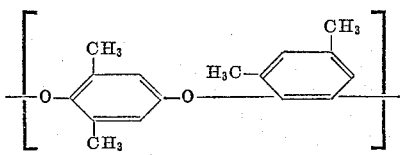

However, a comparison of this formula with that of Example 7 will show that the two are identical. The intrinsic viscosity of the product was .07. The main difference between Examples 7 and 8 is that in Example 7 the para position is involved in the oxidation while in Example 8 it is the ortho position. The latter does not react as readily and causes the yield of product to be less.

Example 9

One and four-tenths grams of 2,6-dimethyl-4-(2'-n-propyl-6'-methylphenoxy)phenol was oxidized by the general method. The initial temperature was 30.5°. After the exothermic reaction (temperature rose to 36.5°), the reaction mixture was heated to 70°. The total reaction time was 10 minutes. The product was poly-[2,6-dimethyl-4-(2' - n - propyl - 6'-methylphenoxylene)phenylene-1,4']ether and had the repeating unit

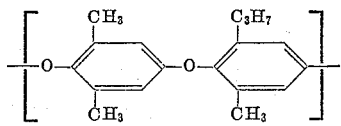

The product had an intrinsic viscosity of 0.16.

Example 10

Three and one-half grams of 2,6-dimethyl-4-(2'-phenylphenoxy)phenol was oxidized by the general method. After the initial exothermic reaction (temperature rose to 47° in 1 minute from 30°), the temperature was raised to 70°. Total reaction time was 10 minutes. The solid product was poly-[2,6-dimethyl-4-(2'-phenylphenoxylene)phenylene-1,4']ether, having an intrinsic viscosity, 0.07. It had the repeating unit

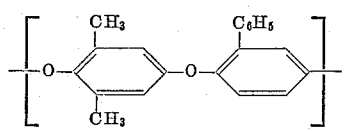

The above examples have illustrated the preferred embodiments of my invention. However, it will be readily apparent to those skilled in the art that other modifications can be made without departing from the scope of the present invention. For example, a solvent may be used to dissolve the starting materials but which is a non-solvent for the polyarylene ethers after a predetermined molecular weight is attained. This permits one to produce products with very uniform molecular weight.

When anion exchange resins, metallic oxides, or other insoluble materials are present as modifiers of the reaction, they should be filtered from the solution before the product is precipitated to aid in their removal.

Although water does not have a deleterious effect on the reaction, if the oxidation is being carried out in a continuous reaction scheme where the catalyst and solvent are reused, I prefer to limit the water present to approximately one mole for each mole of copper catalyst present.

Because of their excellent physical, mechanical, chemical, electrical, and thermal properties the polymers of this invention have many and varied uses. For example, they can be used in molding powder formulations either alone or mixed with various fillers, such as wood flour, diatomaceous earth, carbon black, silica, etc., to make molded parts such as spur, helical, worm, or bevel ears, ratchets, bearings, cams, impact parts, gaskets, valve seats for high pressure oil, and gas systems or other chemical fluids requiring resistance to chemicals, etc. They can be used to prepare molded, calendered, or extruded articles, films, coatings, threads, filaments, tapes, and the like. They can be applied to a broad spectrum of uses in the forms of sheets, rods, tapes, etc., and are useful in electrical applications such as in cable terminals, terminal blocks, backing for electrical circuits, as components of dynamoelectric machines that operate at high temperatures, etc. Films of these materials can be prepared by suitable means such as by dissolving or suspending them in a suitable solvent, followed by spreading on a surface from which the polymer is removed after evaporation of the solvent, by calendering, extrusion, etc. These films (either oriented or not) are useful as metal or fiber liners, containers, covers, closures, electrical insulating tapes, as sound recording tapes, pipe and wire tapes, etc. As a coating material they can be applied as a solution or suspension to any convenient foundation where a surface possessing their excellent properties is desired. They can be used as an encapsulation material for electrical insulation, for example, as a wire enamel, potting compound, etc. They can be extruded from melt, solution or suspension, into a precipitating solvent or evaporating medium, etc. The fibers so produced (oriented or not) can be woven into fabrics useful in many applications, for example, as filter cloth where high chemical and heat resistance is desired. Their excellent electrical properties make laminates of this material useful for electrical equipment, such as slot wedges in the armature of an electric motor, panel boards for printed circuits, electrical appliance panels, radio and television panels, small punched electrical pieces, transformer terminal boards, transformer coil spacers, and so forth. The polymers may also be mixed with various fillers, modifying agents, etc., such as dyes, pigments, stabilizers, plasticizers, etc.

Obviously, other modifications and variations of the present invention are possible in the light of the above teachings. It is therefore to be understood that changes may be made in the particular embodiments of the invention described which are within the full intended scope of the invention as defined by the appended claims.

What I claim as new and desire to secure by Letters Patent of the United States is:

1. The process of forming self condensation products of aryloxy phenols which comprises reacting oxygen, in the presence of a tertiary amine and a cuprous salt soluble in the tertiary amine and capable of existing in the cupric state, with a phenol having the structural formula

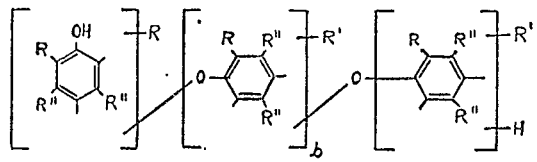

where $b$ is an integer and is at least 0 and not more than 1, R is a monovalent substituent selected from the group consisting of hydrocarbon radicals, holahydrocarbon radicals having at least 2 carbon atoms, alkoxy radicals and haloalkoxy radicals having at least 2 carbon atoms, R' and R'' are the same as R and in addition hydrogen.

2. The process as in claim 1 wherein R is a hydrocarbon radical and R' and R'' are hydrogen.

3. The process as in claim 1 wherein R and R' are methyl and R'' is hydrogen.

4. The process as in claim 1 where R is methyl, and R' and R'' are hydrogen.

5. The process of preparing self condensation products of phenols which comprises reacting oxygen in the presence of a tertiary amine and a cuprous salt soluble in the tertiary amine and capable of existing in the cupric state with a phenol having the structural formula

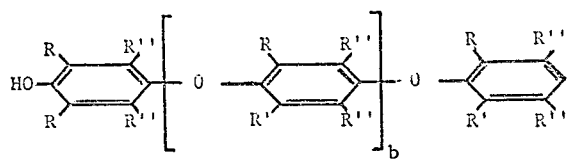

where $b$ is an integer and is at least 0 and not more than 1, R is a monovalent substituent selected from the group consisting of hydrocarbon radicals, halohydrocarbon radicals having at least 2 carbon atoms, alkoxy radicals and haloalkoxy radicals having at least 2 carbon atoms, R' and R'' are the same as R and in addition hydrogen.

6. The process as in claim 5 wherein R is a hydrocarbon radical and R' and R'' are hydrogen.

7. The process as in claim 5 wherein R and R' are methyl and R'' is hydrogen.

8. The process as in claim 5 wherein R is methyl and R' and R'' are hydrogen and $b$ has the value of zero.

9. The process as in claim 5 wherein the phenol has the structural formula

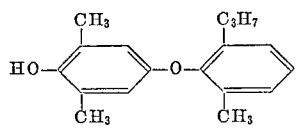

10. The process as in claim 5 wherein the phenol has the structural formula

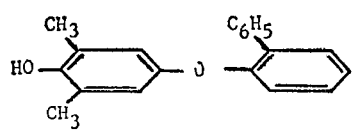

11. Polyphenylene ethers as in claim 16 wherein R is a hydrocarbon radical and R' and R'' are hydrogen.

12. Polyphenylene ethers as in claim 16 wherein R is methyl and R' and R'' are hydrogen.

13. Polyphenylene ethers as in claim 17 wherein R is a hydrocarbon radical and R' and R'' are hydrogen.

14. Polyphenylene ethers as in claim 17 wherein R is methyl and R' and R'' are hydrogen and $b$ has the value of zero.

15. The high molecular weight resinous condensation product produced by the process of claim 1.

16. Polyphenylene ethers having an intrinsic viscosity of at least 0.07 whose chemical structure consists essentially of units of the structural formula

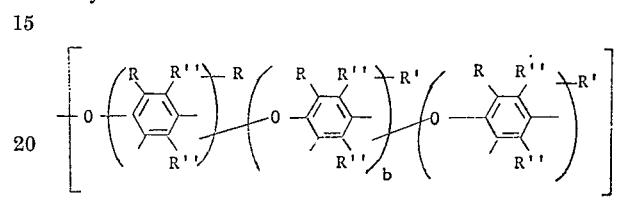

where the free valence of the terminal oxygen atom of one unit is connected to the free valence of the terminal benzene nucleus of the adjoining unit, $b$ is one of the following 0, 1, R is a monovalent substituent selected from the group consisting of hydrocarbon radicals, halohydrocarbon radicals having at least 2 carbon atoms, alkoxy radicals and haloalkoxy radicals having at least 2 carbon atoms, R' and R'' are the same as R and in addition hydrogen, R, R' and R'' being so chosen that at least two adjacent aryl nuclei of the repeating unit are structurally different from each other.

17. Polyphenylene ethers having an intrinsic viscosity of at least 0.07 whose chemical structure consists essentially of units of the structural formula

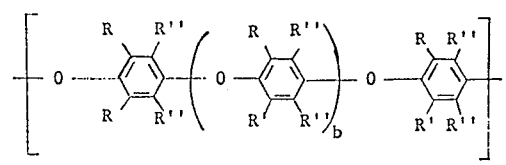

where the free valence of the terminal oxygen atom of one unit is connected to the free valence of the terminal benzene nucleus of the adjoining unit, $b$ is one of the following 0, 1, R is a monovalent substituent selected from the group consisting of hydrocarbon radicals, halohydrocarbon radicals having at least 2 carbon atoms, alkoxy radicals and haloalkoxy radicals having at least 2 carbon atoms, R' and R'' are the same as R and in addition hydrogen, R, R' and R'' being so chosen that at least two adjacent aryl nuclei of the repeating unit are structurally different from each other.

18. Polyphenylene ethers having an intrinsic viscosity of at least 0.07 whose chemical structure consists essentially of units of the structural formula

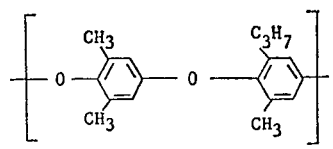

where the free valence of the terminal oxygen atom of one unit is connected to the free valence of the terminal benzene nucleus of the adjoining unit.

19. Polyphenylene ethers having an intrinsic viscosity of at least 0.07 whose chemical structure consists essentially of units of the structural formula

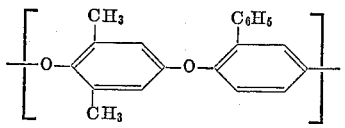

where the free valence of the terminal oxygen atom of one unit is connected to the free valence of the terminal benzene nucleus of the adjoining unit.

References Cited in the file of this patent

UNITED STATES PATENTS

| | | |
|---|---|---|
| 2,911,380 | Doedens | Nov. 3, 1959 |
| 2,961,384 | McKinney et al. | Nov. 22, 1960 |

FOREIGN PATENTS

| | | |
|---|---|---|
| 165,408 | Great Britain | Sept. 22, 1922 |
| 357,756 | Germany | Aug. 31, 1922 |

OTHER REFERENCES

Ellis: "Chemistry of Synthetic Resins," pages 270–272, Rheinhold (1935).

Hay: "Polymerization by Oxidative Coupling. II. Oxidation of 2,6-Disubstituted Phenols," Journal of Polymer Science, vol. 58, pages 581–591 (1962), page 588 especially relied upon.

Disclaimer 3,134,753.—*Jack Kwiatek*, Schenectady, N.Y. OXIDATION OF ARYLOXY-SUBSTITUTED PHENOLS. Patent dated May 26, 1964. Disclaimer filed Oct. 9, 1964, by the assignee, *General Electric Company*.

Hereby enters this disclaimer to claims 1 to 19, inclusive, of said patent.

[*Official Gazette January 19, 1965.*]